ATTACHMENT FOR TONE ARM CONTROL IN AUTOMATIC RECORD PLAYERS

Filed July 13, 1953 2 Sheets-Sheet 1

INVENTOR.
HAIM MURRO
BY
James and Franklin
ATTORNEY

May 26, 1959 H. MURRO 2,888,267

ATTACHMENT FOR TONE ARM CONTROL IN AUTOMATIC RECORD PLAYERS

Filed July 13, 1953 2 Sheets-Sheet 2

INVENTOR.

HAIM MURRO

BY James and Franklin

ATTORNEY

United States Patent Office 2,888,267
Patented May 26, 1959

2,888,267

ATTACHMENT FOR TONE ARM CONTROL IN AUTOMATIC RECORD PLAYERS

Haim Murro, Jerusalem, Israel

Application July 13, 1953, Serial No. 367,566

13 Claims. (Cl. 274—15)

The present invention relates to a mechanism particularly adapted for use as an attachment with automatic record players, but which could alternatively be permanently built into said record players, in order to provide greater flexibility of control thereof, the apparatus serving to lift the tone arm from a record and deposit said tone arm onto a record at various times and onto various places, at the will of the user.

The rapidly growing popularity of long playing high fidelity records has brought with it certain new requirements insofar as the operation of record players, and particularly those of the automatic type, are concerned. While the records themselves are usually substantially unbreakable, the sound-producing grooves thereof cannot be similarly characterized. On the contrary, these grooves are so fine and so closely spaced that great care must be exercised in lifting the tone arm from the record or depositing the tone arm onto the record, lest the stylus damage the grooves, either by completely breaking down the wall between adjacent grooves or by distorting the side of the wall and thus destroying the fidelity of sound reproduction. So critical is the problem that any time the tone arm stylus is manually placed upon a record or removed therefrom, except at the beginning or end of a grooved portion of the record, real danger exists that the record might be irreparably damaged because the movement of the stylus is not directly perpendicular to the plane of the record. Persons who value their records insist that if the stylus is to be removed from the record at an intermediate point on the recorded surface, only the automatic tone arm moving mechanism can be employed for that purpose, and manual placing of a stylus at a point intermediate of the recorded surface of the record is forbidden.

Unfortunately, insofar as this aspect of operation of record players is concerned, the automatic tone arm moving mechanism is an indivisible part of a record changing or dropping mechanism. Again unfortunately for this aspect of the matter, most record changing systems have a device for automatically sensing whether records remain in the storage stack for subsequent placement upon the turntable, and if no such records are present, the entire record player is automatically brought to a stop with the tone arm outside the periphery of the turntable. Hence these automatic record players present a real problem to persons who wish to start a record in the middle and at the same time preserve the fidelity of reproduction of such records, and then replay that particular record. If no other records are available in the storage stack, two manual operations must be performed. First the "reject" button must be pressed to initiate a record changing sequence and cause the tone arm to be lifted from the record in a safe manner. Then, after the sequence has gone to completion, the entire system coming to a stop with the tone arm positioned outside the periphery of the turntable, a second operation must be performed to restart the record player. If records are available in the storage stack, ready to be transferred one by one to the turntable, the problem presented to the person who wishes to replay a particular passage is further complicated. Actuation of the automatic record changing system to safely lift the tone arm also involves the dropping of the next record to the turntable, and in order to prevent this it is usually necessary to actually remove the storage stack of waiting records from operative connection with the record changing system before the reproduction of the record on the turntable is actually interrupted.

With long playing records the problem described above is greatly accentuated, because a given long playing record often has a number of separate sections, each slightly spaced from the other, each section representing a different selection or a different movement of a major opus. This same fact makes for a further drawback to the use of conventional automatic record changers. Those changers are usually designed so that the tone arm is automatically lowered toward the turntable at a selected one of a plurality of rigidly predetermined positions depending upon the size of the record being reproduced. However, no provision has been made in the past for producing further flexibility of control in the lowering of the tone arm, so that the tone arm may be automatically lowered onto a given record no matter of what size, at a predetermined point, which point will vary from record to record and at the choice of the operator, depending upon the particular section of the record reproduction of which is desired. While the tone arm can usually be manually positioned for selective reproduction of this type, possible damage to the record grooves is inherent in such manual positioning, as discussed above, and in addition some record players are so designed that manual positioning of the tone arm is advised against because of its tendency to dislocate the tone arm moving mechanism or throw it out of adjustment.

The present invention provides in a simple manner for the attainment of such flexibility of control in automatic record players as to solve the problems outlined above. The mechanism of the present invention can easily be incorporated into the design of existing automatic record changers without requiring any appreciable modification of the mechanism already adopted, and at least some aspects of the present invention are particularly adapted for incorporation into already existing record changers through the use of a simple and readily mounted attachment.

According to the present invention, a manual control is provided which acts upon a standard pre-existing linkage for lifting the tone arm in a truly vertical manner, said manual control actuating that linkage and lifting the tone arm or permitting the tone arm to be lowered entirely independently of actuation of the record changing system as a whole. Hence whenever the operator wishes to terminate reproduction he may do so without any of the complicating factors previously mentioned. More specifically, he can lift or lower the tone arm entirely indepndently of any of the record-moving or -dropping mechanism. He can then manually move the tone arm either to a new position over the record, where it can be accurately vertically lowered by means of the merchanism of the present invention, or he can move the tone arm beyond the periphery of the record to its rest position. No danger to the operation of the automatic record changing system is involved in this operation, since the tone arm is always free to move while in reproducing position. According to a refinement of the present invention this same mechanism, when actuated, will disable the record sensing mechanism, so that actuation of this mechanism at the same time that the record changing system itself is actuated, and when no records remain in the storage stack to be dropped onto the turntable, will give rise to a "repeat" action rather than cause the record player to come to a stop.

A further mechanism here disclosed and claimed acts on that portion of the tone arm actuating linkage of a standard pre-existing record changing system which determines the position at which the tone arm is automatically deposited onto the record, controlling that linkage in accordance with the positioning of an indicator which may be manually moved to any desired position over the record, the tone arm being accurately deposited at the radial position on the record to which the indicator is set. Here again the mechanism is such that it can readily be incorporated into existing record changers without requiring modification of the tone arm moving mechanism there employed. A resetting feature is preferably provided, so that after the tone arm has been deposited on the record the indicator is moved to an inoperative position, from which it may again be operatively positioned at the will of the operator.

To the accomplishment of the above, and to such other objects as may hereinafter appear, the present invention relates to tone arm control mechanism adapted to be incorporated into an automatic record changer or player, as defined in the appended claims and as described in this specification, in which:

Figure 4:
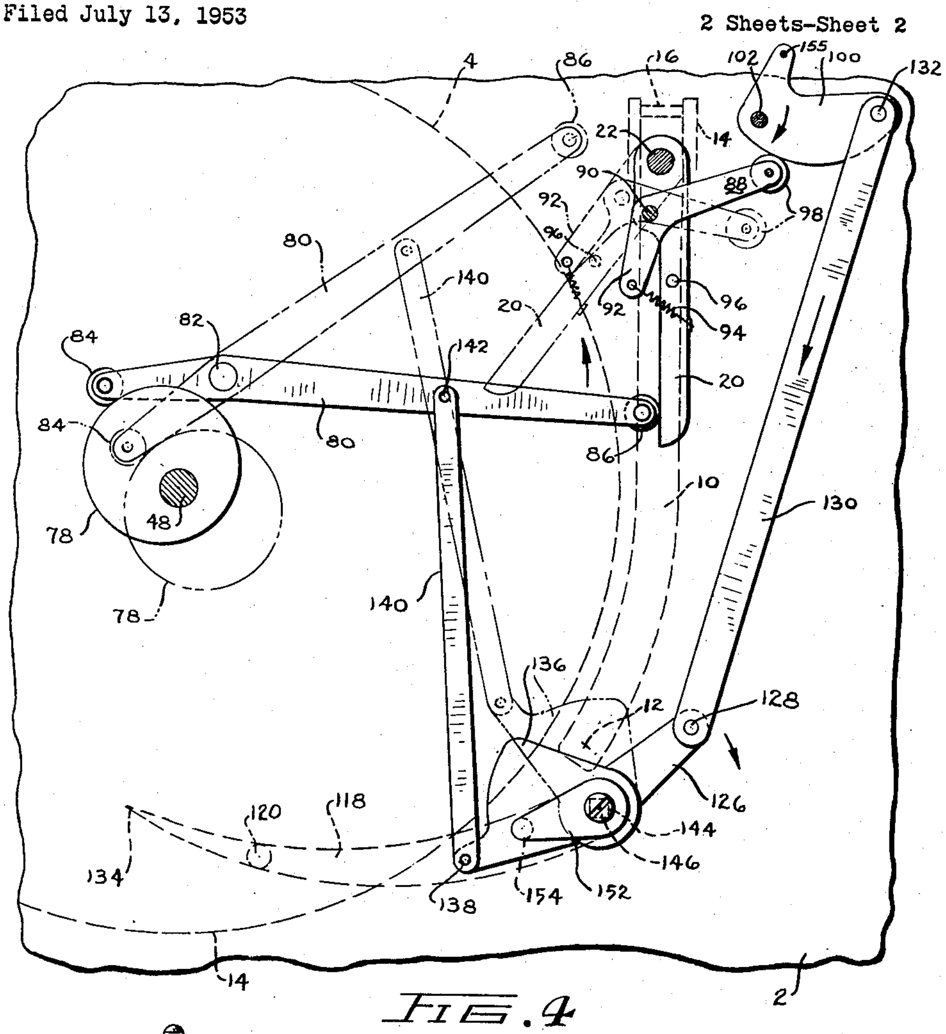
Figure 5:
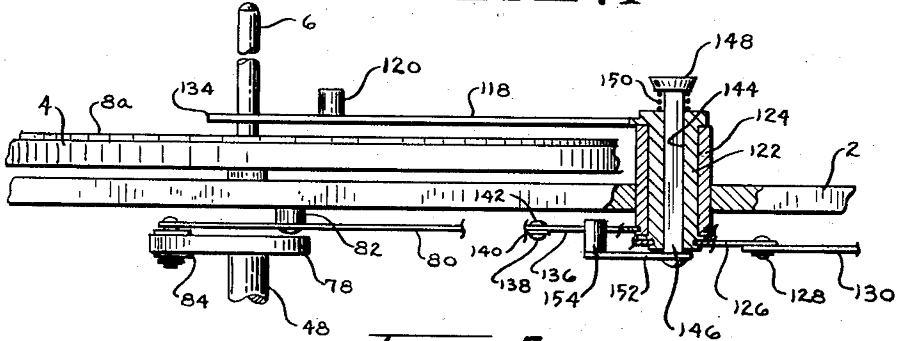

Fig. 4 is a simplified schematic view, taken from below and looking up toward the base plate of the record, showing the manner in which the attachment for controlling the position at which the tone arm is deposited onto a record cooperates with the parts of the pre-existing record changing system; and Fig. 5 is a similar schematic view, taken from the side, but showing the parts in a different operative position.

The apparatus of the present invention is here disclosed as used in conjunction with a high fidelity automatic record changer, Model R.C. 80, manufactured by the Garrard Engineering & Mfg. Co. Ltd. England and available on the open market. The details of the operating mechanism of this record changer, except as they cooperate with the mechanism of the present invention, will not be specifically described. It will be understood, however, that the specific details of the mechanism of the present invention can readily be modified, within the skill of any competent mechanic, so as to function with existing record changers of specifically different designs.

Figures 1, 2, 3:
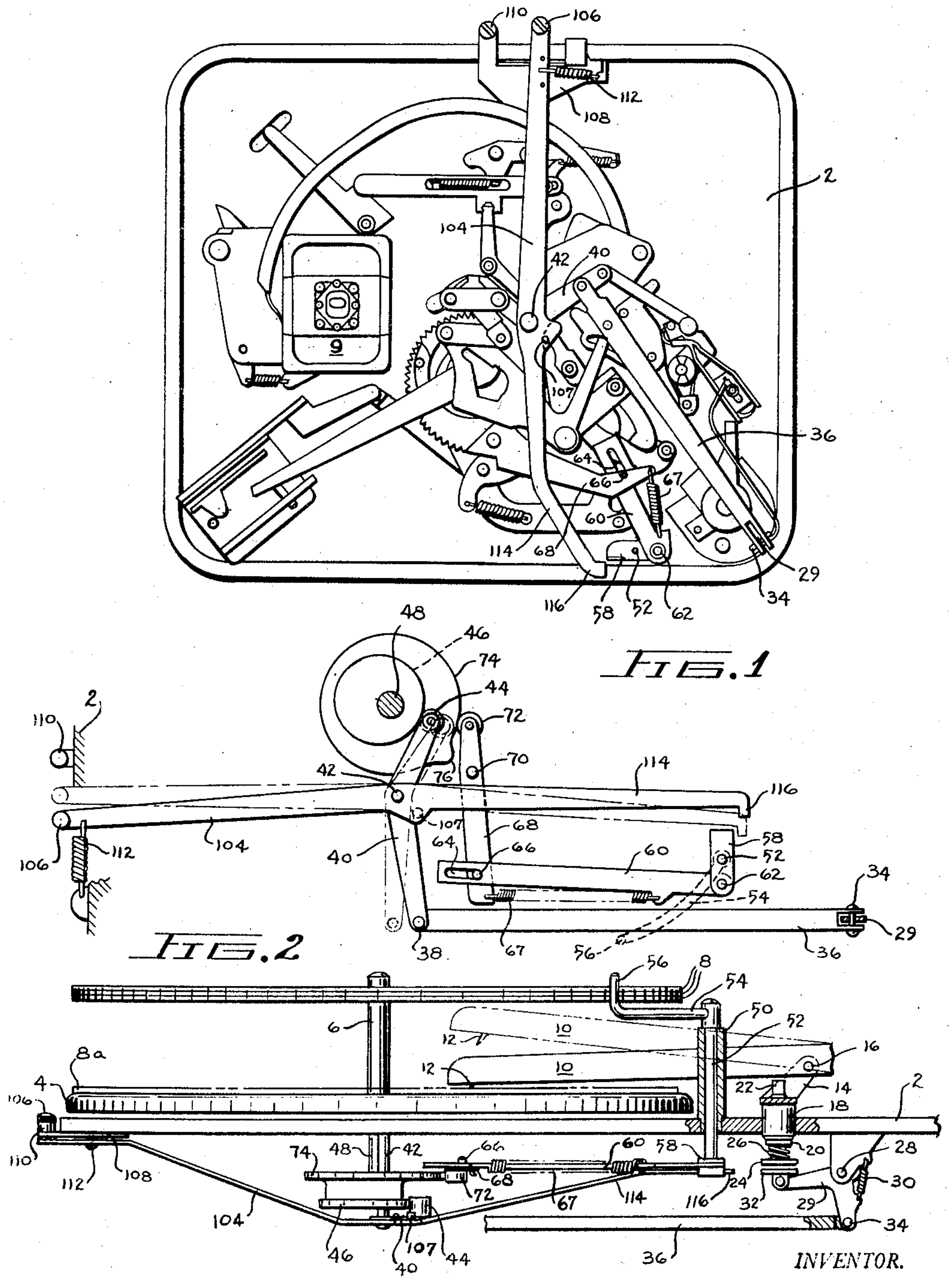
Fig. 1 is a bottom plan view of one specific type of record changer now available on the market, with the tone arm lifting and depositing attachment of the present invention in place.
Fig. 2 is a simplified schematic view taken from below and looking up toward the base plate of the record changer, showing the manner in which the attachment of the present invention cooperates with the pertinent portions of the pre-existing record changer system.
Fig. 3 is a simplified side elevational schematic view showing the same parts.

The record changer comprises a base plate 2 on the upper surface of which a turntable 4 is rotatably mounted, a spindle 6 extending up therefrom on which a stack of records 8 may be supported in any appropriate manner for dropping, one by one, to the turntable 4, Figs. 3 and 5 showing a record 8*a* in position on the turntable. A motor 9 mounted beneath the base plate 2 is operatively connected to the turntable 4 so as to drive it in rotation. A tone arm 10 carrying a stylus 12 is mounted on bracket 14 so as to be pivotal about the horizontal axis 16. The bracket 14 is rotatably mounted in bearing 18 which passes through the base plate 2, and is operatively connected to an arm 20 beneath the base plate which causes the tone arm 10 to swing horizontally between points beyond the periphery of the turntable and over the turntable. A pin 22 is vertically slidable through the bracket 14, its upper tip being positioned under the tone arm 10 at a point spaced from the axis 16 and its lower end carrying a plate 24 spring urged downwardly by spring 26 to a position such that the upper tip of the pin 22 is removed from contact with the tone arm 10 when the stylus 12 is deposited on the record 8*a*. However, when the pin 22 is pushed upwardly against the action of the spring 26 it engages the underside of the tone arm 10 and causes it to pivot in a clockwise direction about the axis 16 to its position shown in phantom in Fig. 3, the stylus 12 thus being raised from the record 8*a* in a substantially vertical manner so as not to cause any damage to the record grooves. The tone arm operating mechanism includes a bell crank lever 29 pivotally mounted at 28 and biased by spring 30 so that the plate 32 carried thereby is normally out of engagement with the plate 24 of the pin 22. Pivotally secured to another portion of the lever 29, at 34, is a link 36 which is in turn pivotally connected, at 38, to a bell crank lever 40 pivotally mounted at 42 and having a cam follower 44 engageable with the eccentric cam 46 rotatable with the cam shaft 48 which is driven in any appropriate manner. The spring 30 biases the follower 44 into engagement with the cam 46.

A post 50 is mounted on the base plate 2 beyond the periphery of the turntable 4, and a shaft 52 is rotatable therein, the upper end of the shaft 52 being connected to feeler arm 54 having an end portion 56 exposed in the plane of the stack of records 8 positioned above the turntable 4. The lower end of the shaft 52 passes below the base plate 2 and has an arm 58 secured thereto, a connecting link 60 being pivotally mounted thereon at 62. Connecting link 60 is provided with an elongated slot 64 within which pin 66 secured to lever 68 is received, the lever 68 being pivotally mounted at 70 and having a cam follower 72 adapted to engage the cam 74, which is provided with an outwardly extending portion 76.

A third eccentric cam 78 is provided on the cam shaft 48 (see Figs. 4 and 5), and a lever 80 pivotally mounted at 82 has a cam follower 84 urged into engagement therewith by any appropriate means. The other end of the lever 80 has a roller 86 adapted to engage the arm 20 secured to the bracket 14. When the lever 80 is in its position shown in Fig. 4, the roller 86 forces the arm 20 to its position shown, thus swinging the tone arm outwardly beyond the periphery of the turntable 4. When the cam shaft 48 rotates through 180 degrees, the lever 80 will assume the position shown in broken lines in Fig. 4, the roller 86 then being removed from engagement with the arm 20 so as to permit the tone arm 10 to move inwardly over the record 8*a*. In order to urge the tone arm 10 to a given initial position over the record 8*a*, a bell crank lever 88 is pivotally mounted on the arm 20 at 90, the end 92 of that lever being connected by spring 94 to the arm 20, the arm 20 having a pin 96 extending therefrom into the plane of the end 92 of the lever 88. The other end of the lever 88 is provided with a cam follower 98 engageable with cam 100 pivotal about axis 102 and movable to any predetermined position. As shown in Fig. 4, the position of the cam 100 will positively fix the position of the lever 88, the end 92 thereof being separated from the pin 96 when the arm 20 and tone arm 10 are swung out beyond the periphery of the turntable 4, the spring 94 being tensioned. When the lever 80 pivots to its broken line position, the arm 20 is released and the spring 94 moves the arm 20 toward the end 92 of the lever 88 until the pin 96 engages therewith. This determines the initial position of the tone arm over the record 8*a*. Once the tone arm has been deposited on the record, it will be urged inwardly through its reaction with the record, thus causing the arm 20 to pivot in a clockwise direction as viewed in Fig. 4, the pin 96 having come in contact with the edge 92 of lever 88, this latter moves solidly with the arm 20, the spring 94 holding the two parts together, as shown in phantom lines on Fig. 4. This arrangement permits the tone arm 10 to be tracked by the grooves of the record, thru its stylus 12, having to overcome only the friction of the bracket 14 in the bearing 18. When the tone arm 10 is next swung out beyond the periphery of the record through the action of the lever 80 the spring 94 will carry the lever 88 along until the cam follower 98 engages cam 100, the tone arm 10 and arm 20 then continuing to pivot in a counter-clockwise direction and tensioning the spring 94.

At appropriate points in the record changing sequence, the tone arm will be lifted from and deposited on the record 8*a*. This is accomplished by means of the cam 46, the lever 40, the connecting link 36 and the lever 29. As the cam 46 rotates the lever 40 will be pivoted in a clockwise direction as viewed in Fig. 2 to its position shown in broken lines, the link 36 will be pulled to the left, the lever 29 will be pivoted in a clockwise direction as viewed in Fig. 3 thus stretching the spring 30, the plate 32 will engage and lift the plate 24 against the action of the spring 26, the pin 22 will be lifted, and the tone arm 10 will be lifted. Depositing of the tone arm on the record is achieved through movement of the linkages in the opposite direction.

At an appropriate point in the record changing sequence the feeler arm 54 is adapted to be swung inwardly. If records are in position above the turntable, its inward movement will be positively stopped, and the record changing sequence will take its normal course. If, however, no records are in position above the turntable, the feeler arm 54 will move inwardly to a greater degree, thus conditioning the record changing system in a known manner so that the tone arm, instead of being deposited over the turntable, will be deposited beyond the periphery of the turntable and the record changer will be caused to stop. This movement is brought about by the action of the cam 74 on the lever 68. When the raised portion 76 of the cam 74 engages the cam follower 72, the lever 68 is pivoted in a clockwise direction as viewed in Fig. 2, the link 60 is pulled to the left by the spring 67, the shaft 52 is caused to rotate in a clockwise direction as viewed in Fig. 2, and the feeler arm 54 is swung inwardly. If it engages one of the records 8, the pin 66 will slide within the slot 64, extending the spring 67, thus constituting a lost motion connection.

In accordance with the present invention an attachment is provided to permit the tone arm to be lifted or dropped vertically, and in a controlled manner, independently of movement of the cam 46. An arm 104 is pivotally mounted beneath the base plate 2, the mounting here being shown as on the axis 42 about which the lever 40 rotates, the arm 104 being mounted below the lever 40, this mode of mounting facilitating use of the arm 104 as a separate attachment applied to an already existing record changing structure. One end of the arm 104 extends to the periphery of the base plate 2 and is there provided with a finger piece 106. This arm end is mounted in close proximity to bracket 108 having another fingerpiece 110 extending therefrom in close proximity to the fingerpiece 106, a spring 112 being active between the bracket 108 and the arm 104 so as to urge its fingerpiece 106 away from the fixed fingerpiece 110. The fingerpieces 106 and 110 are available for manual access from the top of the base plate 2. Another portion of the arm 104 is provided with a projecting part 107 which extends into the plane of the lever 40. When the lever 40 is in its position corresponding to the lowering of the tone arm 10 and when the attachment arm 104 is in its spring biased position, as shown in solid lines in Fig. 2, the projecting part 107 is close to, and may be in engagement with, an edge of the lever 40 displaced from its pivotal axis 42. When the fingerpiece 106 is moved toward the fingerpiece 110, as shown in broken lines in Fig. 2, the arm 104 is caused to pivot in a clockwise direction, its projecting part 107 pushes against an edge of the lever 40, the lever 40 is caused to pivot in a clockwise direction, its cam follower 44 being lifted from the cam 46, and consequently the linkage 36, 29, 32, 24, 22 causes the tone arm to be lifted in a substantially vertical manner. Upon release of the fingerpiece 106, the spring 112 causes the parts to return to their solid line positions and permits the tone arm 10 to be lowered to the record 8*a*. Its rate of descent may be manually controlled via the fingerpiece 106 in order to prevent damage to the record. It will be noted that the record lifting and lowering operation is performed utilizing the already existing linkages provided in the automatic record changing system, but without actuating that system so as to cause it to operate automatically.

In the form here specifically disclosed the arm 104 is provided with an extension 114 having a finger 116 which is normally out of the path of movement of the arm 58 secured to the shaft 52 which rotates the feeler arm 54 but which is movable into the path of movement of the arm 58, as shown in broken lines in Fig. 2, whenever the fingerpiece 106 is moved toward the fingerpiece 110. The clockwise rotation of the arm 58 and the feeler arm 54 will thus be limited to substantially the same degree as though the feeler arm 54 had sensed the presence of records 8 above the turntable when the raised portion 76 of the cam 74 actuate the feeler arm 54. Hence, if repetition of a single record is desired the record changing system may be actuated and the disclosed attachment actuated at the same time by moving the fingerpiece 106. Without the attachment, the record changing system would deposit the tone arm at a point beyond the turntable and the record player would come to a stop. With the attachment, the record 8*a* on the turntable will be automatically repeated.

The mechanism of Figs. 4 and 5 is designed to control the position at which the tone arm is initially deposited on the record so that it may thus be deposited at any desired radial position with respect to the record, and not just at the outer periphery thereof, as is the case in record changers without this attachment. To that end an indicator or pointer 118 having a manipulating knob 120 is mounted on hollow shaft 122 passing through bushing 124 which penetrates the base plate 2 beyond the periphery of the turntable 4. Secured to the lower end of the shaft 122 for rotation therewith is arm 126 pivotally connected at 128 with link 130 which is in turn pivotally connected at 132 to the cam 100. The linkage is such that when the indicator 118 is pivoted to a position in which its tip 134 extends over the turntable 4, the cam 100 will be rotated to such a degree as to position the lever 88 so as to cause the initial position of the stylus 12 on the tone arm 10 to accurately correspond radially of the record 8*a* to the position of the indicator tip 134 when the pin 96 on arm 20 has engaged the end 92 of the lever 88.

In some instances it may be desired to have the indicator 118 reset to its inoperative position beyond the periphery of the turntable 4. To this end plate 136 is mounted on the bushing 124 so as to be rotatable thereon, and is pivotally connected, at 138, with link 140 the other end of which is pivotally connected at 142 to the lever 80. The shaft 122 has a passageway 144 through which pin 146 extends, the upper end of the pin having button 148 secured thereto and spring 150 being interposed between the shaft 122 and the button 148 so as to urge the pin 146 upwardly. The pin 146 is adapted to rotate with the shaft 142, the passageway 144 being here shown as non-circular in cross section and the pin 146 fitting therein. The lower end of the pin 146 carries arm 152 positioned below the plate 136 and having a finger 154 extending up toward the plate 136. When the lever 80 and the plate 136 are in their solid line position as shown in Fig. 4, and when the indicator 118 is positioned outside the periphery of the turntable 4, the finger 154 is positioned beyond the plate 136, and the spring 150 is active to move the arm 152 and the pin 146 upwardly. This position is illustrated in Fig. 5. With the lever 80 and plate 136 in this position, if it is desired to position the indicator 118 over the periphery of the turntable 4, the button 148 is depressed, thus moving the finger 154 below the plate 136. After the indicator 118 has been positioned the button 148 is released and the spring 150 tends to urge the pin 146 upwardly, but this movement is prevented by engagement between the upper end of the finger 154 and the lower surface of the plate 136. When the lever 80 is moved by the cam 78 to its position shown in phantom in Fig. 4, the plate 136 is correspondingly moved to a position such that it clears the finger 154, that finger then rising through the action of the spring 150. When the lever 80 is moved back to its position shown in Fig. 4 the edge of the plate 136 will engage the finger 154 and thus cause the arm 152, the pin 146, the shaft 122, and the indicator 118 to rotate in a counterclockwise direction so as to cause the parts thereof to assume the position shown in Fig. 5, with the indicator 118 reset to its inoperative position beyond the periphery of the turntable 4.

From the above explanation it will be apparent that the apparatus of the present invention permits much greater flexibility of use of automatic record changers by providing for manual control of the lifting and lowering of the tone arm independently of the actuation of the record changing system as a whole and permits control of the automatic lowering of the tone arm so that the latter can be accurately positioned so as to make initial contact with the record to be reproduced at any selected radial point thereon. In addition, a modification of the operation of the record changing system is permitted whereby a record may readily be repeated. All of this is accomplished by the addition to the record changing mechanism of but a very limited number of simple operational elements. The record lifting attachment, in particular, may be added to an already existing record changer in a simple manner, and without requiring the modification or disassembly of said existing record changing system, and thus is particularly well adapted for sale as an attachment to be added to existing record changers by those who desire the additional modes of facility for control afforded by that attachment.

It will be understood that many variations may be made in the specific details of the present invention without departing from the spirit thereof as defined in the following claims.

I claim:

1. In a record player having a base plate, a tone arm pivotally mounted above said base plate, a turntable rotatably mounted on said base plate, and an automatic tone arm positioning system comprising a driven lever mounted below said base plate so as to be pivotable about an axis between first and second positions and operatively connected to said tone arm for lowering the tone arm onto a record and lifting said tone arm from a record on said turntable respectively at appropriate points in the tone arm positioning sequence; the improvement which comprises an attachment comprising an arm mounted beneath said base plate so as to be pivotal about the axis of said lever and movable between first and second positions, said arm carrying an abutment spaced from said axis, extending to the plane of said lever, operatively displaced from said lever when said arm is in its first position, and engageable with said lever and effective to move said lever to its second position when said arm is moved to its second position, and an actuator exposed for manual access, movable between first and second positions, and operatively connected to said arm to move the latter between its first and second positions.

2. The apparatus of claim 1, in which said lever and said arm are biased to their first positions respectively.

3. The apparatus of claim 2, in which said actuator comprises an extension integral with said arm, extending under said base plate to a point outside the periphery of said turntable, and having an exposed manually manipulatable finger piece operatively connected thereto.

4. The apparatus of claim 1, in which said actuator comprises an extension integral with said arm, extending under said base plate to a point outside the periphery of said turntable, and having an exposed manually manipulatable finger piece operatively connected thereto.

5. The apparatus of claim 1, said record player additionally comprising a record sensing member and an automatically driven linkage operatively connected thereto by a lost motion connection for moving said member from a first inoperative position toward a second operative position, said attachment comprising a second abutment operatively connected to said arm, operatively disconnected from said sensing member when said arm is in its first position and operatively connected to said sensing member between the latter and said lost motion connection and effective to limit the degree of movement of said sensing member when said arm is in its second position.

6. The apparatus of claim 5, in which said lever, said sensing member and said arm are biased to their first positions respectively.

7. The apparatus of claim 5, in which said actuator comprises an extension integral with said arm, extending under said base plate to a point outside the periphery of said turntable, and having an exposed manually manipulatable finger piece operatively connected thereto.

8. In a record player having a base plate, a tone arm pivotally mounted above said base plate, a turntable rotatably mounted on said base plate, and an automatic tone arm positioning system comprising a driven element beneath said base plate, operatively connected to said tone arm and movable between first and second positions for swinging said tone arm beyond the periphery of said turntable and permitting said tone arm to move inwardly over said turntable, said tone arm positioning system further comprising a variably positionable element operatively connected to said tone arm for determining the position to which said tone arm will be moved inwardly above said turntable by said actuating system; the improvement which comprises an indicator pivotally mounted above said base plate beyond the periphery of said turntable and manually movable from beyond said turntable to any desired position over said turntable, a shaft fast to said indicator and passing through said base plate, an operative connection between said shaft and said variably positionable element for positioning the latter in accordance with the position of said indicator, an indicator-resetting element movably mounted beneath said base plate and operatively connected to said driven element so as to be positioned thereby, a vertically movable member extending from above to beneath said base plate, spring urged to an upper position, operatively connected to said indicator so as to move therewith relative to said base plate, and carrying an arm beneath said base plate and movable therewith which bears a part normally projecting into the plane of said indicator-resetting element but being movable out of said plane when said vertically movable member is depressed, said member being engageable with an edge of said indicator-resetting element when in the plane thereof, whereby, upon depression of said member, said indicator may be positioned independently of the position of said resetting element and said automatically driven element, said member part then sliding over said resetting element, engagement between said member part and said resetting element edge moving said indicator to a point beyond the periphery of said turntable at an appropriate point in the tone arm actuating sequence.

9. In a record player having a base plate, a tone arm pivotally mounted above said base plate, a turntable rotatably mounted on said base plate, and an automatic tone arm positioning system comprising a driven lever articulately mounted so as to be movable between first and second positions and operatively connected to said tone arm for lowering the tone arm onto a record and lifting said tone arm from a record on said turntable respectively at appropriate points in the tone arm positioning sequence, said automatic tone arm positioning system additionally comprising a record sensing member and an automatically driven linkage operatively connected thereto by a lost motion connection for moving said member from a first inoperative position toward a second operative position; the improvement which comprises an attachment comprising an arm articulately mounted beneath said base plate and movable between first and second positions, said arm being operatively connected to an abutment engageable with said driven lever and effective, when said arm is moved from its first to its second position, to move said driven lever to its second position, said arm being operatively connected to a second abutment operatively disconnected from said record sensing member when said arm is in its first position and operatively connected to said record sensing member between the latter and said lost motion connection and effective to limit the degree of movement of said record sensing member when said arm is in its second position, and an actuator exposed for manual access, movable between said first and second positions, and operatively connected to said arm to move the latter between its first and second positions.

10. The apparatus of claim 9, in which said driven lever, said record sensing member and said arm are biased to their first positions respectively.

11. An attachment for an automatic record player having a tone arm and an automatic tone arm positioning system comprising a driven lifting member operatively connected to said tone arm and movable between first and second positions to lower said tone arm onto a record and lift said tone arm from a record respectively at appropriate points in the tone arm positioning sequence, said automatic system further comprising a record sensing member and an automatically driven linkage operatively connected thereto by a lost motion connection for moving said member from a first inoperative position toward a second operative position, said attachment comprising an arm articulately mounted on said record player for movement between first and second positions, an actuator operatively connected to said arm and exposed for manual manipulation to move said arm, an abutment operatively connected to said arm, substantially free of said lifting member which forms a part of said automatic positioning system when said arm is in its first position and engageable with said lifting member and effective to move said member to its second position when said arm is moved to its second position, and a second abutment operatively connected to said arm, operatively disconnected from said record sensing member when said arm is in its first position, and operatively connected to said record sensing member between the latter and said lost motion connection and effective to limit the degree of movement of said sensing member when said arm is in its second position.

12. The apparatus of claim 11, in which said lifting and sensing members and said arm are biased to their first positions respectively.

13. In a record player having a base plate, a tone arm pivotally mounted above said base plate, a turntable rotatably mounted on said base plate, and an automatic tone arm positioning system comprising a driven element beneath said base plate, operatively connected to said tone arm and movable between first and second positions for swinging said tone arm beyond the periphery of said turntable and permitting said tone arm to move inwardly over said turntable, said tone arm positioning system further comprising means operatively connected to said tone arm for determining the position to which said tone arm will be moved inwardly above said turntable by said actuating system; the improvement which comprises an indicator pivotally mounted above said base plate beyond the periphery of said turntable and manually movable from beyond said turntable over said turntable to any desired position, said indicator being thus movable in close proximity to said turntable so as not to be interfered with by any record which might be stacked above said turntable, a member mounted below said base plate and operatively connected to said indicator for movement therewith, an operative connection between said member and said means for determining the inward position of said tone arm, whereby the latter may be positioned in accordance with the position of the indicator, an indicator-resetting member, means operatively connecting said indicator-resetting member to said driven element so that the former will be positioned in accordance with the position of said element, and a disconnectable operative connection between said indicator-resetting member and said indicator, said connection being disconnectable to permit positioning of said indicator independently of said driven element, said connection being automatically reestablished during a tone arm positioning sequence so as to move said indicator to a position beyond the periphery of said turntable at an appropriate point in said sequence.

References Cited in the file of this patent

UNITED STATES PATENTS

| | | |
|---|---|---|
| 1,417,111 | Schlesinger | May 23, 1922 |
| 2,081,885 | Runyan | May 25, 1937 |
| 2,141,804 | Thompson et al. | Dec. 27, 1938 |
| 2,305,086 | Johnson | Dec. 15, 1942 |
| 2,325,708 | Runge | Aug. 3, 1943 |
| 2,333,414 | De Tar | Nov. 2, 1943 |
| 2,351,972 | Johnson | June 20, 1944 |
| 2,584,257 | Cain | Feb. 2, 1952 |
| 2,640,705 | Mortimer | June 2, 1953 |
| 2,723,859 | Stone | Nov. 15, 1955 |
| 2,763,487 | Fortune | Sept. 18, 1956 |